US009824003B2

(12) United States Patent
Sanders et al.

(10) Patent No.: US 9,824,003 B2
(45) Date of Patent: Nov. 21, 2017

(54) DYNAMICALLY RESIZABLE CIRCULAR BUFFERS

(71) Applicant: Imagination Technologies Limited, Kings Langley (GB)

(72) Inventors: Daniel Sanders, Hemel Hempstead (GB); Hugh Jackson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 239 days.

(21) Appl. No.: 13/964,257

(22) Filed: Aug. 12, 2013

(65) Prior Publication Data
US 2014/0075144 A1 Mar. 13, 2014

(30) Foreign Application Priority Data

Sep. 12, 2012 (GB) .................................. 1216255.8

(51) Int. Cl.
 G06F 13/14 (2006.01)
 G06F 12/02 (2006.01)
 G06F 5/10 (2006.01)
(52) U.S. Cl.
 CPC ................ *G06F 12/02* (2013.01); *G06F 5/10* (2013.01); *G06F 2205/063* (2013.01); *G06F 2205/064* (2013.01)
(58) Field of Classification Search
 None
 See application file for complete search history.

(56) References Cited

U.S. PATENT DOCUMENTS

| 7,219,249 | B1* | 5/2007 | Ghose et al. ................. 713/324 |
| 7,376,768 | B1 | 5/2008 | Macciocca |
| 2003/0120886 | A1 | 6/2003 | Moller et al. |
| 2003/0188057 | A1 | 10/2003 | Lam et al. |
| 2006/0153185 | A1* | 7/2006 | Jain et al. ..................... 370/389 |
| 2007/0245074 | A1* | 10/2007 | Rosenbluth ............... G06F 5/10 711/110 |
| 2008/0126736 | A1* | 5/2008 | Heil ............................. 711/171 |
| 2009/0300234 | A1 | 12/2009 | Haga |

OTHER PUBLICATIONS

Sharkey et al, "Adaptive Reorder Buffers for SMT Processors", Sep. 9-20, 2006, PACT'06, Seattle, Washington.*

(Continued)

*Primary Examiner* — Ilwoo Park
(74) *Attorney, Agent, or Firm* — Vorys, Sater, Seymour and Pease LLP; Vincent M DeLuca

(57) ABSTRACT

Methods and apparatus for dynamically resizing circular buffers are described wherein circular buffers are dynamically allocated arrays from a pool of arrays. The method comprises receiving either a request to add data to a circular buffer or to remove data from a circular buffer. If the request is an addition request and the circular buffer is full, an array from the pool is allocated to the circular buffer. If, however, the request is a removal request and removal of the data creates an empty array, an array is de-allocated from the circular buffer and returned to the pool. Any arrays that are not allocated to a circular buffer may be disabled to conserve power.

16 Claims, 12 Drawing Sheets

(56) References Cited

OTHER PUBLICATIONS

Dmitry Ponomarev, Gurhan Kucuk, and Kanad Ghose. 2001. Reducing power requirements of instruction scheduling through dynamic allocation of multiple datapath resources. In Proceedings of the 34th annual ACM/IEEE international symposium on Microarchitecture (MICRO 34). IEEE Computer Society, Washington, DC, USA, 90-101.
Kucuk, et al. "Energy savings in simultaneous multi-threaded processors through dynamic resizing of datapath resources" Turk J Elec Eng & Comp Sci, vol. 20, No. 1, 2012.
Ponomarev, et al. "Dynamic Allocation of Datapath Resources for Low Power" Proc. of the Workshop on Complexity Effective Design WCED '01, ISCA-28, Goteborg Sweden, Jun. 1.
Ponomarev, et al., "Energy—Efficient Design of the Reorder Buffer" Proceedings of the International Workshop on Power and Timing, Modeling, Optimization and Simulation, Sep. 2002.
Sharkey, et al. "Adaptive Reorder Buffers for SMT Processors" PACT'06, Sep. 9-20, 2006, Seattle, Washington.

\* cited by examiner

DYNAMICALLY RESIZABLE CIRCULAR BUFFERS

BACKGROUND

Processors typically comprise one or more circular buffers for storing data. For example, out-of-order processors can provide improved performance by executing instructions in a sequence that is different from the order in the program, so that instructions are executed when their input data is available rather than waiting for the preceding instruction in the program to execute. Such out-of-order processors typically have a re-order buffer (ROB) to enable the instructions to be executed out of order, but committed in-order. ROBs are typically formed as circular buffers with a fixed size.

The embodiments described below are not limited to implementations which solve any or all of the disadvantages of known buffers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for dynamically resizing circular buffers are described wherein circular buffers are dynamically allocated arrays from a pool of arrays. The method comprises receiving either a request to add data to a circular buffer or to remove data from a circular buffer. If the request is an addition request and the circular buffer is full, an array from the pool is allocated to the circular buffer. If, however, the request is a removal request and removal of the data creates an empty array, an array is de-allocated from the circular buffer and returned to the pool. Any arrays that are not allocated to a circular buffer may be disabled to conserve power.

A first aspect provides a circular buffer structure comprising: a plurality of arrays, wherein each array comprises at least two storage elements configured to store data; one or more circular buffers; and buffer control logic configured to: receive at least one of (a) a request to add data to a particular circular buffer and (b) a request to remove data from a specific circular buffer; dynamically allocate an array to the particular circular buffer if the particular circular buffer is full; and dynamically de-allocate an array from the specific circular buffer if removal of the data from the specific circular buffer creates an empty array and disable the de-allocated array.

A second aspect provides a processor comprising a circular buffer structure comprising: a plurality of arrays, wherein each array comprises at least two storage elements configured to store data; one or more circular buffers; and buffer control logic configured to: receive at least one of (a) a request to add data to a particular circular buffer and (b) a request to remove data from a specific circular buffer; dynamically allocate an array to the particular circular buffer if the particular circular buffer is full; and dynamically de-allocate an array from the specific circular buffer if removal of the data from the specific circular buffer creates an empty array and disable the de-allocated array.

A third aspect provides a method of dynamically resizing one or more circular buffers in a processor, the method comprising: providing a plurality of arrays, each array comprising at least two storage elements configured to store data; receiving at buffer control logic at least one of (a) a request to add data to a particular circular buffer and (b) a request to remove data from a specific circular buffer; dynamically allocating using the buffer control logic an array to the particular circular buffer if the particular circular buffer is full; and dynamically de-allocating using the buffer control logic an array from the specific circular buffer if removal of the data from the specific circular buffer creates an empty array and disabling the de-allocated array.

A fourth aspect provides a circular buffer structure substantially as described with reference to FIGS. 2 to 6 of the drawings.

The methods described herein may be performed by a computer configured with software in machine readable form stored on a tangible storage medium e.g. in the form of a computer program comprising computer program code for configuring a computer to perform the constituent portions of described methods The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
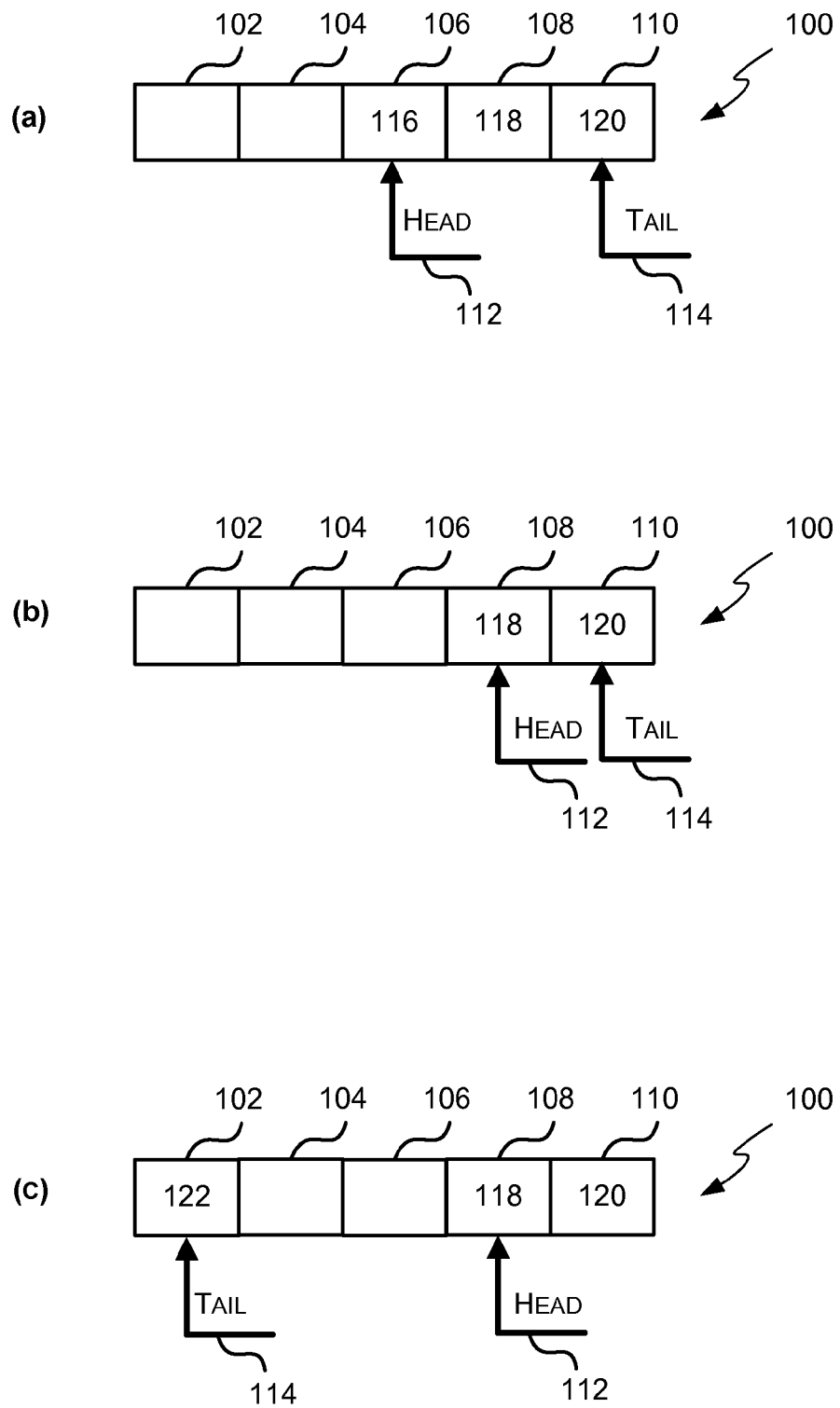
FIG. 1 is a schematic diagram of a known circular buffer.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

A circular buffer (also referred to as a cyclic buffer or a ring buffer) is a data structure used to store data. Circular buffers typically have a fixed number of elements and are controlled by a head pointer and a tail pointer. The head pointer points to the start of valid data and the tail pointer points to the end of valid data. When data is added to a circular buffer the tail pointer is increased and when data is removed from a circular buffer the head pointer is increased. When either of the pointers reaches the end of the buffer, the pointer wraps around to the beginning of the buffer. When the head pointer catches up to the tail pointer the buffer is empty. Conversely when the tail pointer catches up to the head pointer, the buffer is full.

Reference is now made to FIGS. 1a, 1b and 1c which show schematics of a traditional circular buffer 100. The circular buffer 100 is comprised of five elements 102, 104, 106, 108 and 110 and has a head pointer 112 and a tail pointer 114. FIG. 1a shows the circular buffer with data 116, 118 and 120 in three elements 106, 108 and 110. The head pointer 112 points to the third element 106 and the tail pointer 114 points to the fifth element 110. FIG. 1b shows the circular buffer 100 after data has been removed from one element. The header pointer 112 has been incremented so that it now points to the fourth element 108 to reflect the fact that the third element 106 no longer contains valid data. The tail pointer 114 continues to point to the fifth element 110. FIG. 1c shows the circular buffer 100 after new data has been added. The header pointer 112 continues to point to the fourth element 108, but the tail pointer 114 has been incremented to point to the first element 102 to reflect the fact that data 122 has been added to the first element 102. As described above, since the tail pointer 114 was at the end of the buffer 100 when new data was added it wraps around to the beginning of the buffer 100.

The fixed length of traditional circular buffers, such as circular buffer 100, means that they cannot dynamically adjust to changing demands for buffer resources. Accordingly, in situations where the circular buffer does not require all of the resources allocated to it the circular buffer may be wasting resources and power. Furthermore, in situations where the circular buffer requires additional resources the process using the circular buffer may have to stall until an element is removed from the circular buffer.

As described above, processors typically comprise one or more circular buffers for storing data. For example, out-of-order processors typically have a re-order buffer (ROB) to enable the instructions to be executed out of order, but committed in-order. Since ROBs are typically formed as circular buffers they suffer from the resource and power problems associated with traditional circular buffers. These problems are typically multiplied in a multi-threaded out of order processor which typically has one ROB per thread.

Known solutions to this problem include circular buffers which use a link-list structure to store data. Specifically, each element comprises a pointer that points to the location of the next element in the buffer.

The following description describes an improved circular buffer structure in which circular buffers are dynamically allocated resources from a shared pool of resources. Specifically, in the circular buffer structures described herein there is a pool of arrays (each array comprises one or more elements) that are shared by a one or more circular buffers. When a circular buffer requires additional resources a free array from the pool is assigned to the circular buffer, and when a circular buffer no longer requires all of the resources assigned to it, an array is de-assigned to from the circular buffer and returned to the pool. Assigning a new array to a circular buffer comprises updating the tail pointer to point to the new array. Conversely, de-assigning an array from a circular buffer comprises updating the head pointer to point to the next array assigned to the circular buffer. Resources (e.g. arrays) in the shared pool that are not allocated to a circular buffer may be disabled to generate power savings.

The circular buffer structures described herein allow easy access to any element within the circular buffer. This is in stark contrast to the link-list circular buffer which requires traversing the link-list to access a particular element. This circular buffer structures described herein also reduce the amount of storage required for each circular buffer in contrast to the link-list circular buffer. Specifically, as described above the link-list circular buffer requires a pointer per element. In contrast, the circular buffer structures described herein require a maximum of three pointers (a head pointer, a tail pointer and optionally an allocation pointer). Each of these pointers will be described in detail below.

Figure 2:
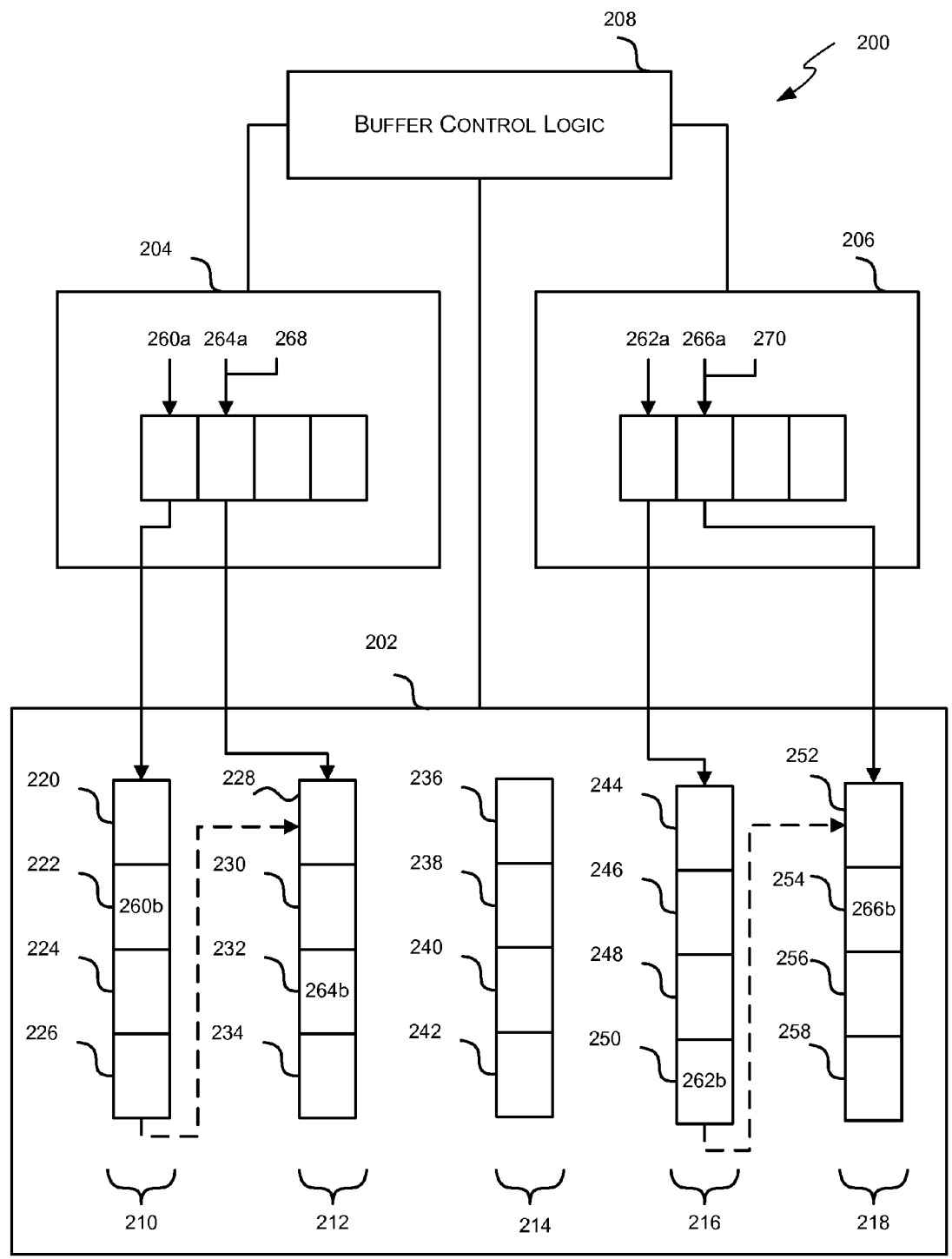
FIG. 2 is a schematic diagram of an example circular buffer structure.

Reference is now made to FIG. 2 which shows a schematic of a circular buffer structure 200 in accordance with an embodiment. The circular buffer structure 200 comprises a pool of arrays 202 that are dynamically allocated to one or more circular buffers 204 and 206 by buffer control logic 208. The term "array" will be used herein to mean a fixed-sized multi-element hardware storage resource.

In the embodiment shown in FIG. 2, the pool of arrays 202 comprises five arrays 210, 212, 214, 216, and 218, however, it will be evident to a person of skill in the art that that the pool of arrays 202 may comprise more or fewer arrays.

Each array 210, 212, 214, 216, and 218 comprises a plurality of elements 220-258 which can be used to store data. Each element represents a separate storage space and may be referred to as a storage element. Each element may, for example, be implemented in RAM (Random Access Memory), hardware registers or other suitable forms of storage. In the embodiment shown in FIG. 2 each array 210, 212, 214, 216, and 218 has four elements 220-258, however, it will be evident to a person of skill in the art that the arrays 210, 212, 214, 216, and 218 may have more or less elements.

In the exemplary circular buffer structure 200 of FIG. 1, there are two circular buffers 204 and 206 that share the pool of arrays 202, however, it will be evident to a person of skill in the art that there may only be one circular buffer that has access to the pool of arrays 202 or there may be more than two circular buffers that have access to the pool of arrays 202.

Each circular buffer 204 and 206 has a head pointer 260 or 262 that points to the first element in the circular buffer 204 or 206 with valid data, and a tail pointer 264 or 266 that points to the last element in the circular buffer 204 or 206 with valid data. The first element with valid data will be referred to herein as the head element and the last element with valid data will be referred to herein as the tail element. In some cases, each pointer 260, 262, 264 and 266 has two parts (e.g. an "a" part and a "b" part). The first part (260a, 262a, 264a, 266a) identifies the array in which the head/tail element resides and the second part (260b, 262b, 264b, 266b) identifies the element within the array in which the head/tail element resides. The two parts may be stored together as a single value and the individual parts extracted as required.

Figure 10:
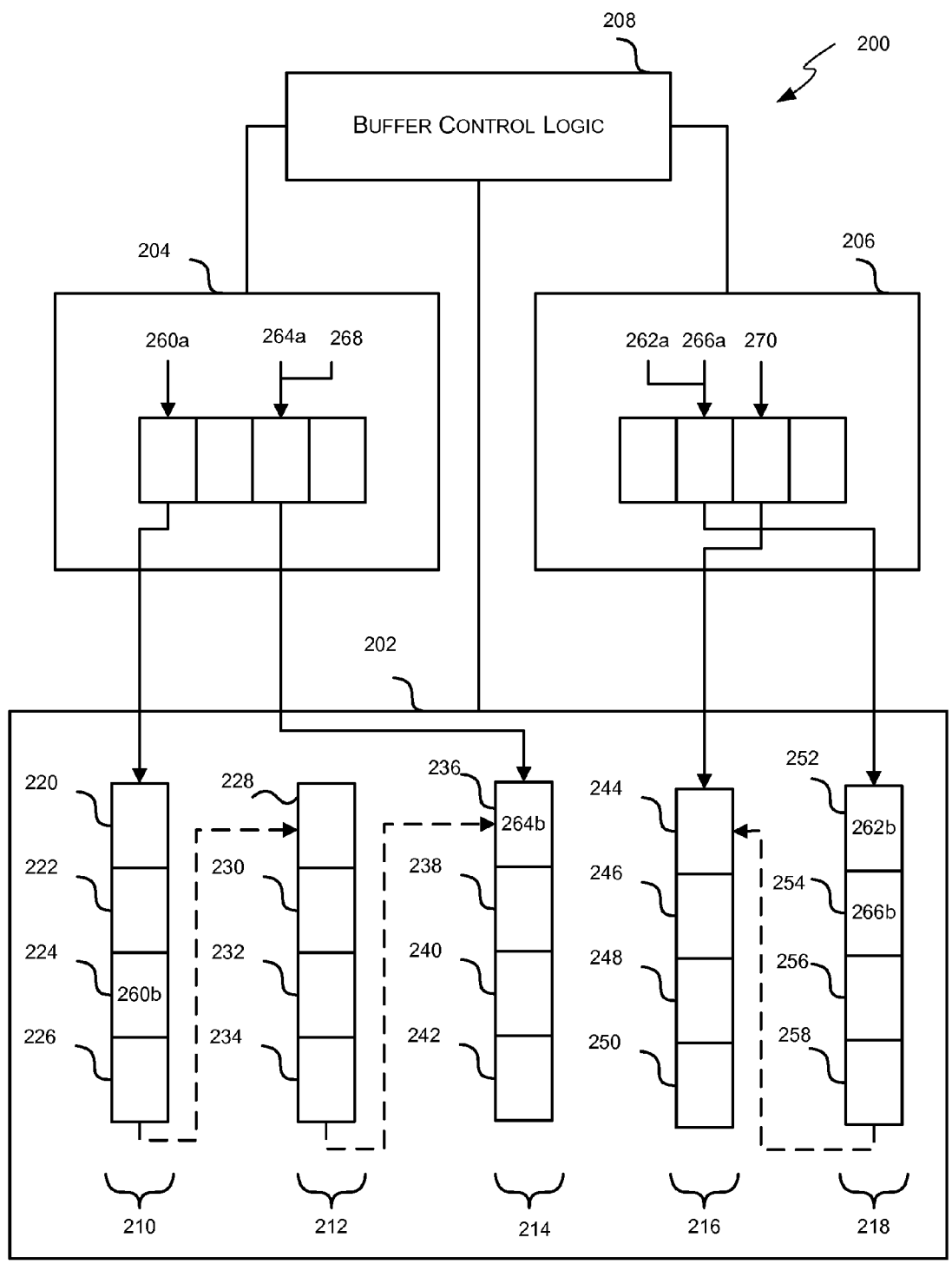
FIG. 10 is a schematic diagram of the circular buffer structure of FIG. 6 after an empty array has been re-allocated to the second circular buffer.

In some cases each circular buffer 204 and 206 may also have an allocation pointer 268 or 270 that points to the last array allocated to the circular buffer 204 or 206. As shown in FIG. 2, in some cases the allocation pointer 268 or 270 may point to the same array as the first part of the tail pointer (264a, or 266a). However, this may not always be the case, particularly when each circular buffer 204 or 206 must have a minimum number of arrays. This is illustrated in FIG. 10.

The buffer control logic 208 controls the operation of the circular buffers 204 and 206. Specifically, the buffer control logic 208 controls the addition and removal of data to/from the circular buffers 204 and 206 and dynamically allocates and de-allocates arrays 210, 212, 214, 216 and 218 to/from the circular buffers 204 and 206 as resources are needed, or are no longer needed. This will be described in further detail below. The buffer control logic 208 may be implemented in hardware.

In some cases the buffer control logic 208 may be comprised of an element addition/removal module (not shown) and an array allocation/de-allocation module (not shown). The element additional/removal module handles addition and removal requests where the allocation of arrays 210, 212, 214, 216 and 218 to circular buffers 204 and 206 does not change. The array allocation/de-allocation module handles allocation and de-allocation of arrays 210, 212, 214, 216 and 218 to the circular buffers 204 and 206. When the element addition/removal module detects that a change to the array allocation is required, it works in conjunction with the array allocation/de-allocation module to obtain and/or return arrays 210, 212, 214, 216 and 218 from/to the pool 202.

The element addition/removal module may have one sub-part for each circular buffer 204 and 206 sharing the pool of arrays 202. Each sub-part executes the addition and removal requests for a single circular buffer 204 or 206. For example, in FIG. 2, the element additional/removal module logic may comprise two sub-parts. The first sub-part may manage addition and removal requests for the first circular buffer 204 and the second sub-part may manage addition and removal requests for the second circular buffer 206.

Separating the buffer control logic 208 functions in this manner reduces the synchronization required between different circular buffers (e.g. circular buffers 204 and 206) allowing them to operate independently when working with resources that they have been allocated.

Since it is possible for two circular buffers (e.g. circular buffer 204 and 206) to require changes to the array allocation at the same time, the array allocation/de-allocation module may be configured to handle situations where it receives multiple allocation/de-allocation requests at the same time. In some cases the array allocation/de-allocation module may be configured to respond to a second simultaneous allocation request by notifying the associated sub-part that there are no available arrays in the pool. This may cause the sub-part to wait a predetermined time and then try again. Similarly, the array allocation-de-allocation module may be configured to respond to a second simultaneous de-allocation request by notifying the associated sub-part that the array allocation/de-allocation module is not available. This may cause the sub-part to wait a predetermined time and then try again. In other cases, the array allocation/de-allocation module may be configured to support multiple allocations/de-allocations in parallel. The decision on whether to support multiple allocation/de-allocations may be made to balance the increased performance realized by supporting multiple allocation/de-allocations versus the more complicated logic required to support this.

In FIG. 2, the first circular buffer 204 has been assigned the first and second arrays 210 and 212, and the second circular buffer 206 has been assigned the fourth and fifth arrays 216 and 218. The arrays assigned to each circular buffer 204 or 206 are logically linked so that they form a single continuous array. For example, the last element 226 in the first array 210 is logically connected to the first element 228 in the second array 212 to form one continuous array, and the last element 250 in the fourth array 216 and the first element 252 in the fifth array 218 are logically connected to form another continuous array. The remaining array 214 is referred to as an unused or free array and may be disabled until it is required by one of the circular buffers 204 or 206.

The head pointer 260 of the first circular buffer 204 points to the second element 222 in the first array 210 and the tail pointer 264 points to the third element 232 in the second array 212. The head pointer 262 of the second circular buffer 206 points to the fourth element 250 in the fourth array 216 and the tail pointer 266 points to the second element 254 in the fifth array 218.

Figure 3:
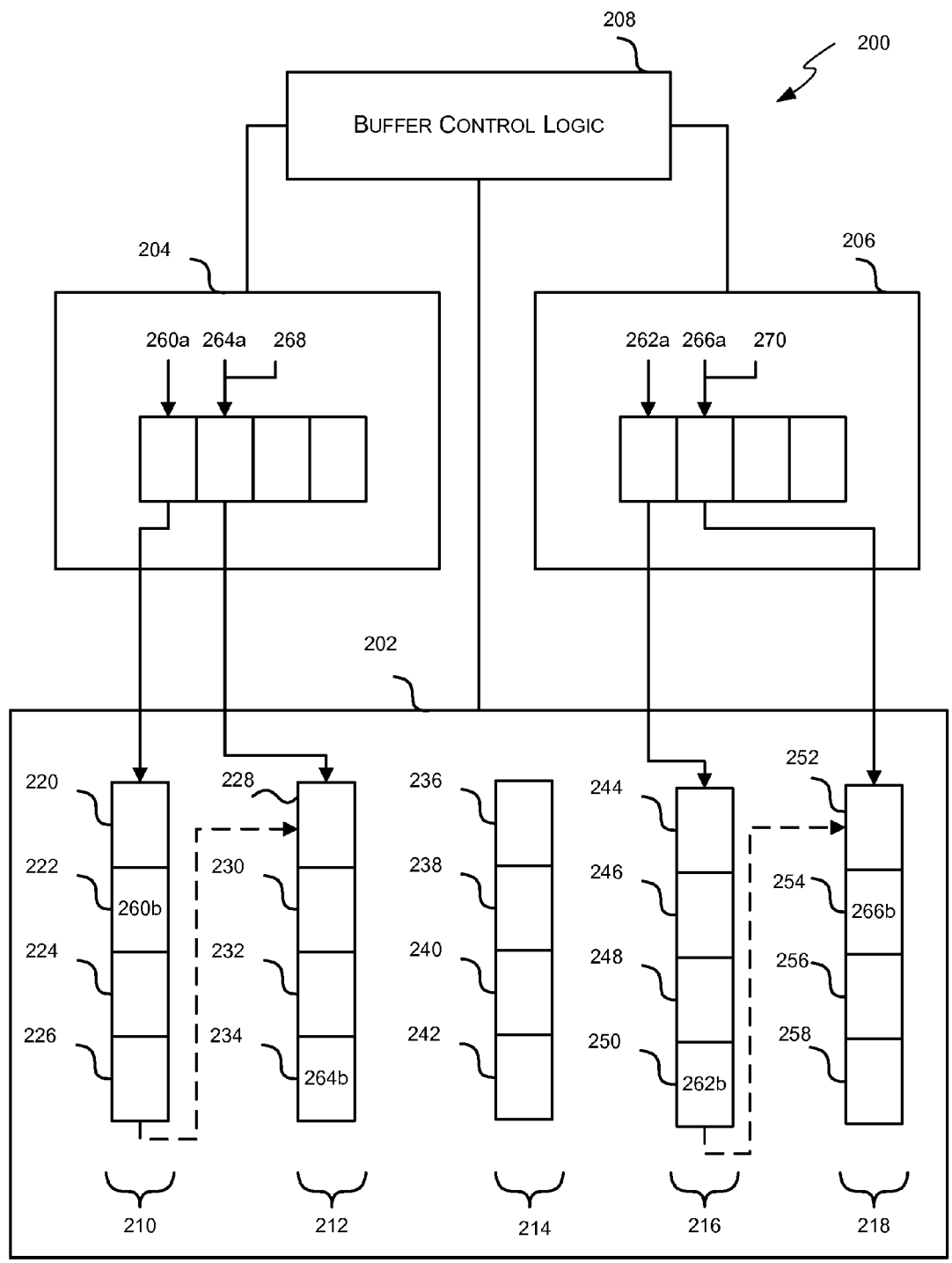
FIG. 3 is a schematic diagram of the circular buffer structure of FIG. 2 after data has been added to the first circular buffer.
Figure 4:
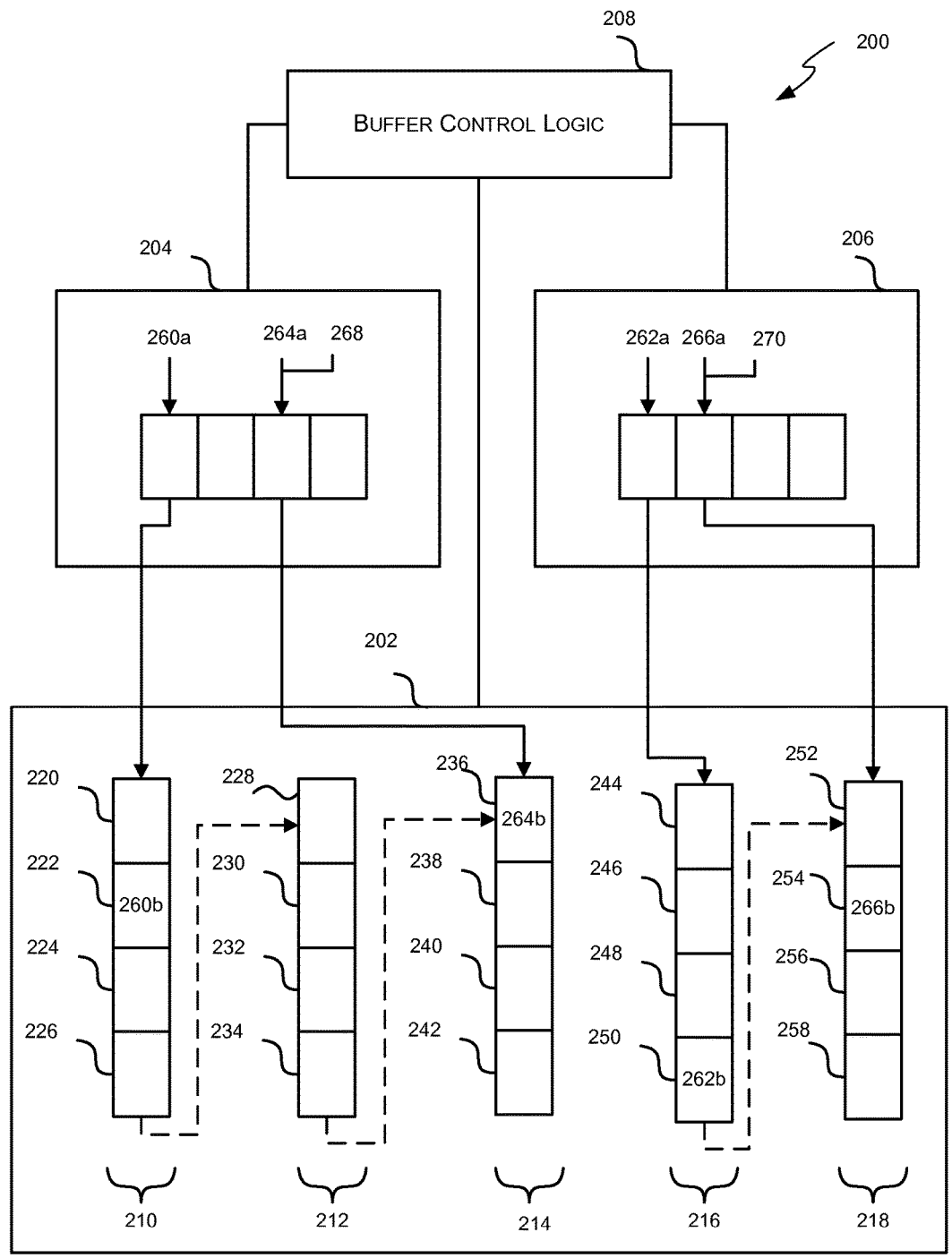
FIG. 4 is a schematic diagram of the circular buffer structure of FIG. 3 after data has been added to the first circular buffer.

When the buffer control logic 208 receives a request to add or push new data into a circular buffer 204 or 206 the buffer control logic 208 places it in the next free element of the array(s) already assigned to the circular buffer 204 or 206. The tail pointer 264 or 266 is then incremented to reflect the new tail element of the circular buffer. Where there are no free elements in the array(s) already assigned to the circular buffer 204 or 206 then one of the free or unused arrays is assigned to the circular buffer 204 or 206 to increase the capacity of the circular buffer 204 or 206. If there are no unused or free arrays then the process trying to add the data to the circular buffer 204 or 206 may stall. Reference is now made to FIGS. 3 and 4 which illustrate the process of adding or pushing data onto a circular buffer 204 or 206.

Specifically, FIG. 3 shows a schematic of the buffer structure 200 of FIG. 2 after new data has been added or pushed onto the first circular buffer 204. In this case there is a free element 234 in the arrays 210 and 212 already assigned to the circular buffer 204 so the new data is added to the next free element 234. The tail pointer 264 is also incremented to reflect that the fourth element 234 of the second array 212 is the new tail element.

FIG. 4 shows a schematic of the buffer structure 200 of FIG. 3 after new data has been added to the first circular buffer 204. In this case there is no free element in the arrays 210 and 212 already assigned to the circular buffer 204 for the new data. Accordingly a new array 214 is assigned to the circular buffer 204 and the new data is added to the first element 236 of the new array 214. The tail pointer 264 is also incremented to reflect that the first element 236 in the new array 214 is now the tail element.

When the buffer control logic 208 receives a request to remove or pop data from a circular buffer 204 or 206 the buffer control logic 208 removes the data from the head element and increments the head pointer 260 or 262 to reflect the new head element of the buffer 204 or 206. If the head element is the last element in an array such that removal of the data in the head element creates an empty array, once the data is removed, the empty array is disassociated or de-allocated from the buffer 204 or 206 and becomes a free or unused array. Where this is the case, incrementing the head pointer 260 or 262 moves the head pointer 260 or 262 to the next array associated with the buffer 204 or 206.

Figure 5:
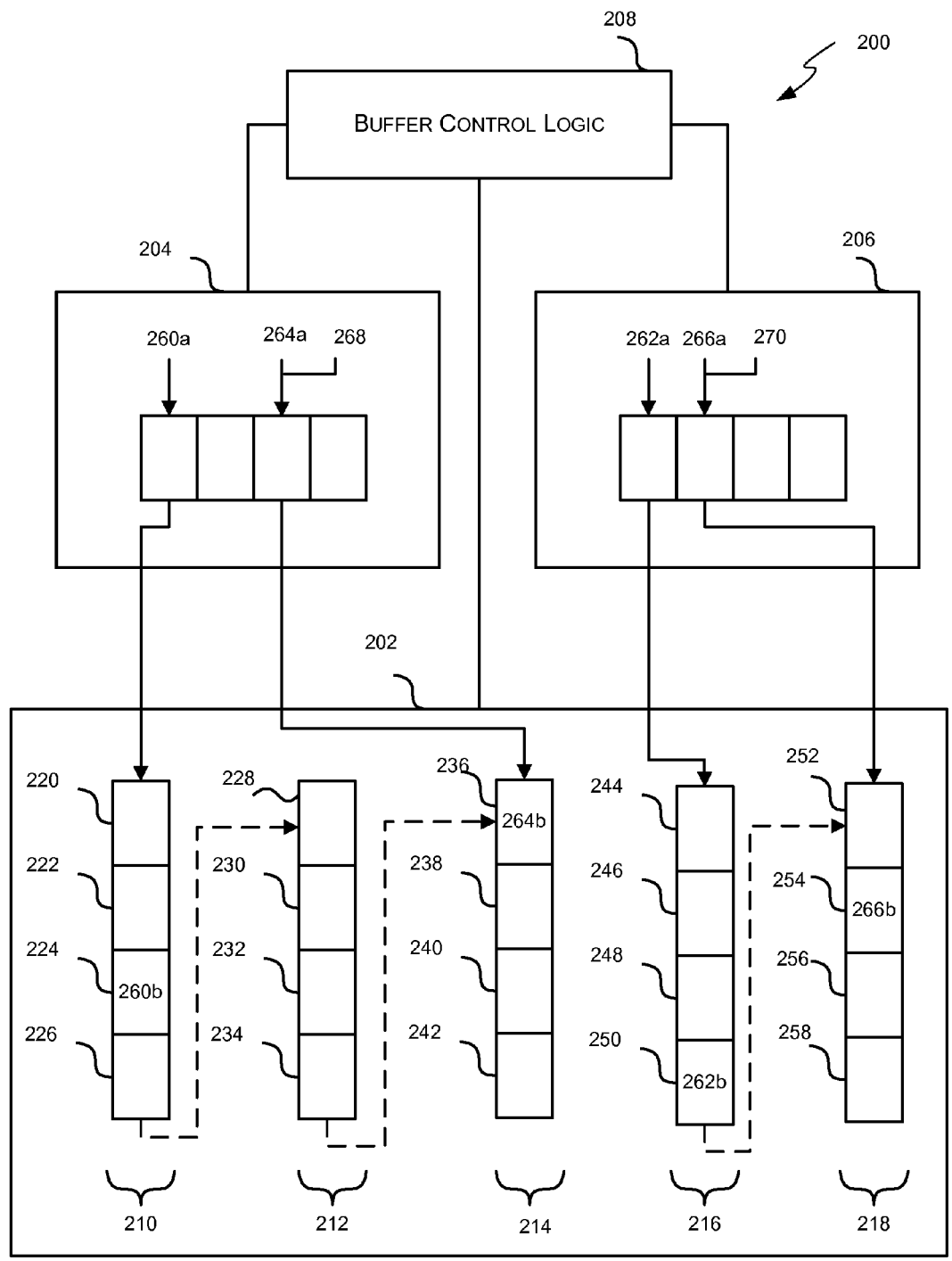
FIG. 5 is a schematic diagram of the circular buffer structure of FIG. 4 after data has been removed from the first circular buffer.
Figure 6:
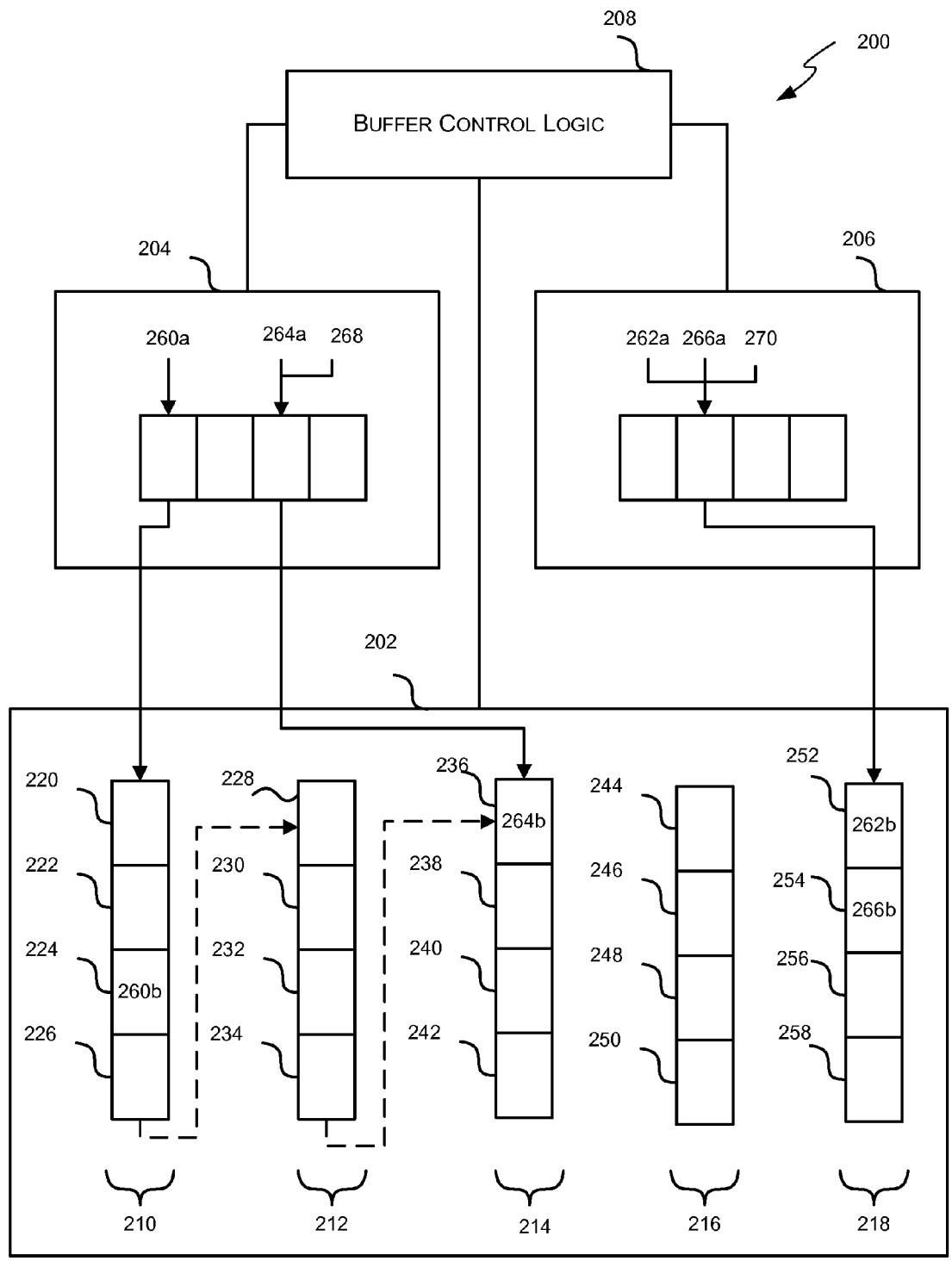
FIG. 6 is a schematic diagram of the circular buffer structure of FIG. 5 after data has been removed from the second circular buffer.

Reference is now made to FIGS. 5 and 6 which illustrate the process of removing or popping data from a circular buffer 204 or 206. Specifically, FIG. 5 shows a schematic of the buffer structure 200 of FIG. 4 after data has been removed or popped off the first circular buffer 204. In FIG. 4 the head element 222 of the first circular buffer 204 is not the last element in an array therefore removal of the data in the head element 222 does not create an empty array. Accordingly, as shown in FIG. 5, after removal of the data in the head element 222 the head pointer 260 is simply incremented to point the next element 224 in the array 210.

FIG. 6 shows a schematic of the buffer structure 200 of FIG. 5 after data has been removed or popped off the second circular buffer 206. In FIG. 5, the head element 250 of the second circular buffer 206 is the last element in an array 216 therefore removal of the data in the head element 250 generates an empty array 216. Accordingly, as shown in FIG. 6, after removal of the data from the head element 250 the empty array 216 is disassociated from the circular buffer 206 and becomes a free or unused array. The head pointer 262 of the second circular buffer 206 is then incremented to point to the first element 252 in the remaining array 218.

As briefly described above, the pool of arrays 202 may be shared by a plurality of circular buffers or may only be accessible by a single circular buffer. Where the pool of arrays 202 is shared by a plurality of circular buffers the total storage required for all of the circular buffers can be reduced. Specifically, since the circular buffers only take arrays from the shared pool when they are needed and return them as soon as they are no longer needed the total number of storage elements required may be reduced.

Regardless of the number of circular buffers (e.g. one or more than one) that share the pool of arrays 202 power consumption may be reduced by turning off or disabling at least a portion of any free or used arrays. There are typically two methods for disabling storage elements. In the first, the clock signal to the unused storage is held so that all the flip-flops stop updating. Once the storage stops receiving the clock signal the flip-flops stop updating so the only power consumption comes from the leakage of the flip-flops. In the second, the power into the storage is turned off. This method is typically more difficult to implement than the first method as it requires the hardware to have multiple power domains and signal clamping on the periphery. This method also takes multiple clock cycles for the state of the storage to stabilize after being turned back on.

In some applications (e.g. re-order buffers and reservation stations in out of order single thread or multi-thread processors) sharing a pool of arrays 202 may result in increased performance since a circular buffer in heavy use may have access to more resources allowing the associated process to continue without being constrained by the length of the circular buffer. For example, in a system with traditional fixed-length circular buffers each circular buffer is allocated a fixed number of elements for its private use. Since each buffer may only use its own allocated elements it is limited to these elements even if there are circular buffers that are not using all of their allocated elements. Conversely, in cases where a plurality of circular buffers share a pool of arrays 202, each circular buffer has access to all the arrays in the pool thus the size of the circular buffer may be dynamically increased when the arrays are not needed by other buffers. This allows circular buffers to expand as necessary to more efficiently use the circular buffer elements.

In some cases all the arrays 210, 212, 214, 216 and 218 may be configured to have the same number of elements 220-258. For example, as shown in FIGS. 2 to 6, all of the arrays 210, 212, 214, 216 and 216 have four elements. In these cases the number of elements in each array 210, 212, 214, 216 and 218 may be selected to balance power savings and flexibility. Specifically, larger arrays provide more power savings when they are turned off or disabled, but they reduce the flexibility. For example, a circular buffer where the head element is the last element in one array and the tail element is the first element in another array still consumes all the resources in both arrays even though a smaller array would be sufficient for the needs of the particular circular buffer.

In other cases, the arrays 210, 212, 214, 216 and 218 may be configured to have different numbers of elements. For example, some of the arrays may have two elements, where other arrays may have four elements. In these cases the buffer control logic 208 may be more complicated than the cases where the arrays are all the same size (e.g. have the same number of elements), but it may lead to more efficient allocation of buffer resources. In some cases how quickly the tail element is catching up with the end of an array may be used as the means for determining whether to allocate a small or large array to a circular buffer. For example, if the tail element of a circular buffer is catching up quickly with the end of an array then a larger array may be assigned to the circular buffer. Conversely if the tail element of a circular buffer is slowly catching up with the end of an array then a smaller array may be assigned to the circular buffer. Specifically, if the tail element is caching up slowly then it is more likely that buffer will maintain its current position then if the tail element is catching up quickly.

In some cases the circular buffers 204 and 206 may be assigned any number of arrays from the pool 202. In these cases it is possible for a circular buffer 204 or 206 to be assigned no arrays in the pool 202 or all the arrays in the pool 202.

In other cases there may be a limit on the minimum and/or maximum number of arrays assigned to any one circular buffer 204 or 206. For example, in some cases the buffer control logic 208 may be configured to assign at least one array to each circular buffer 204 or 206 regardless of whether the circular buffer 204 or 206 requires an array. In other cases the buffer control logic 208 may be configured to ensure that that no circular buffer may be assigned more than a number or percentage (e.g. 90%) of the arrays in the pool 202. In still other cases the buffer control logic 208 may be configured to implement both minimum and maximum thresholds on the number of arrays assigned to any one circular buffer 204 or 206.

Where maximum or minimum thresholds are imposed on the number of arrays assigned to the circular buffers 204 or 206, the thresholds may be the same for all of the circular buffers 204 or 206 or the thresholds may be different for some or all of the circular buffers 204 and 206.

Any minimum and/or maximum thresholds may be predetermined or dynamically calculated. In some cases, the minimum and/or maximum thresholds may be dynamically selected based on whether power savings or speed is currently paramount. For example, the buffer control logic 208 may be configured to decrease the maximum threshold when the buffer control logic 208 detects that a situation has arisen where conserving power is more important than executing jobs quickly. Conversely, the buffer control logic 208 may be configured to increase the maximum threshold when the buffer control logic 208 detects that speed is more important than power consumption. For example, if a single threaded processor switches from running on AC power to battery power, the buffer control logic 208 may be configured to automatically reduce the maximum threshold to reduce power consumption and thus extend the life of the battery.

In other cases, the minimum and/or maximum thresholds may be dynamically selected to implement load balancing. GB Patent 2,372,847 describes a process whereby a program executing on one thread of an in-order multi-threaded processor controls its use of processor resources in such a way that the processing requirements of both that program and any programs executing on other threads is met. Specifically, in GB Patent 2,372,847, the issue stage decides which of the threads should execute on a particular cycle based on how well the threads are meeting their performance requirements and/or how fast a particular thread is executing at the time. GB Patent 2,372,847 also provides a resolution to instructions with conflicting resource requirements by providing a priority ordering of the threads so that the instructions from the most important thread(s) at the time are executed.

Figure 12:
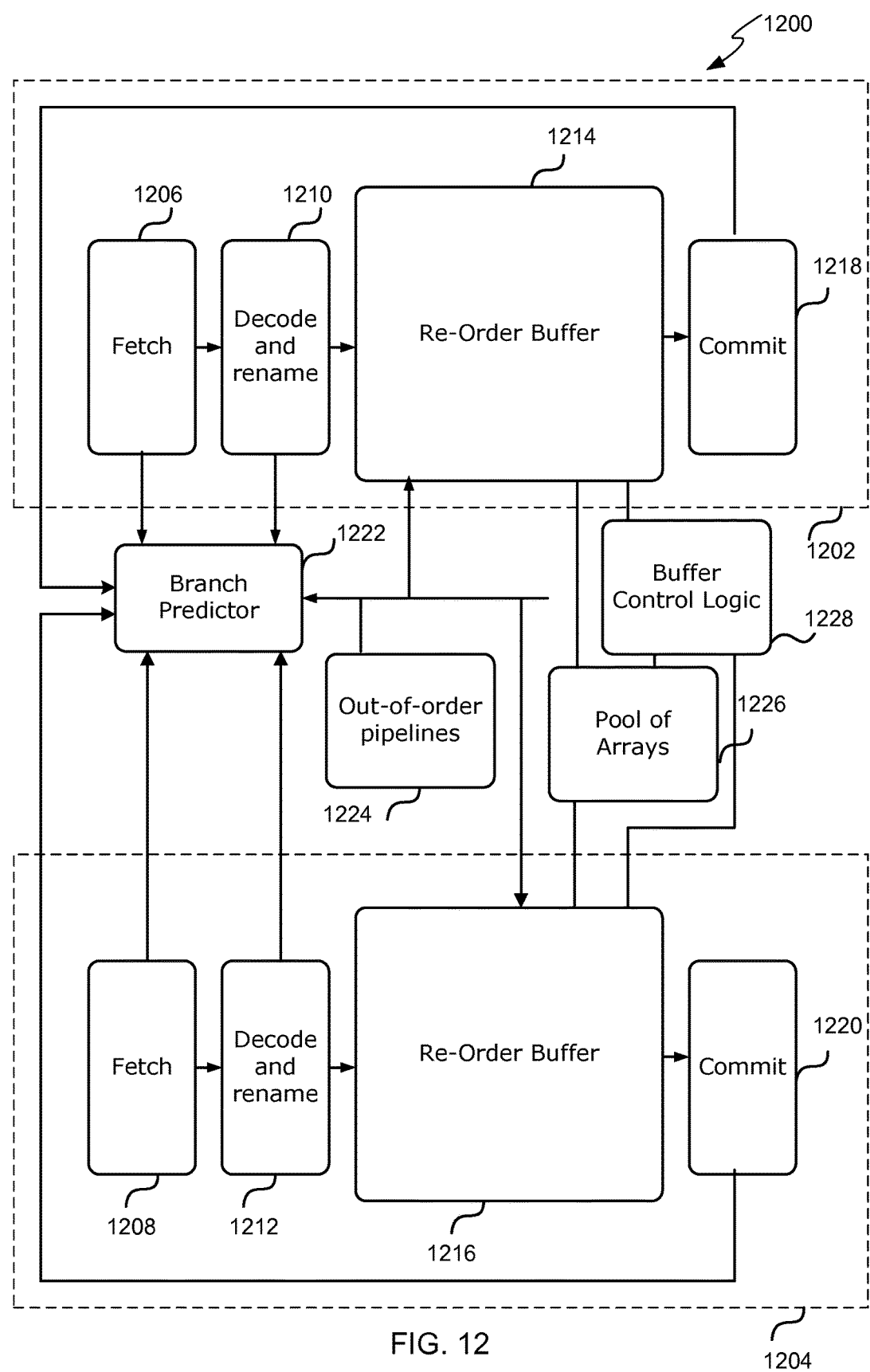
FIG. 12 is a schematic of a multi-threaded out of order processor having a plurality of re-order buffers that share a pool of arrays.

The methods described in GB Patent 2,372,847 may be used in an out-of-order multi-threaded processor to decide between instructions from different threads in the reservation station that exist at the head of each out-of-order pipeline (See FIG. 12 for an example of an out-of-order multi-threaded processor). The main difference is that rather than the issue stage deciding the next instruction on each thread, the reservation station is deciding the next instruction of a particular type on each thread. For example, a particular reservation station may receive only the multiplication instructions. In this case the reservation station decides the next multiply on each thread.

A similar method can be used to indirectly control the execution rate of a particular thread by controlling the size of the re-order buffer. When the re-order buffer is large, more instructions can be "in-flight" at once for a particular thread which may increase the performance of that thread. This performance increase arises from a reduced number of idle out-of-order pipelines per cycle as well as from an increase in the proportion of all pending instructions that belong to that thread (more pending instructions for a particular thread leads to a higher chance that one from that thread will be selected). When the re-order buffer is small, fewer instructions are "in-flight" for that thread which may lead to a reduction in performance for the opposite reasons. Accordingly, the minimum and maximum thresholds for the re-order buffers may be controlled according to the desired execution rate. For example, the maximum threshold may increase with a higher desired execution rate, and decrease with a lower desired execution rate. The minimum threshold may, for example: increase with a higher desired execution rate, and decrease with a lower desired execution rate; increase with the desired execution rate of other threads and decrease with lower desired execution rates; increase with a higher relative priority of the thread, and decrease with a lower relative priority; increase with the scarcity of free arrays in the pool; or any combination thereof.

Figure 7:
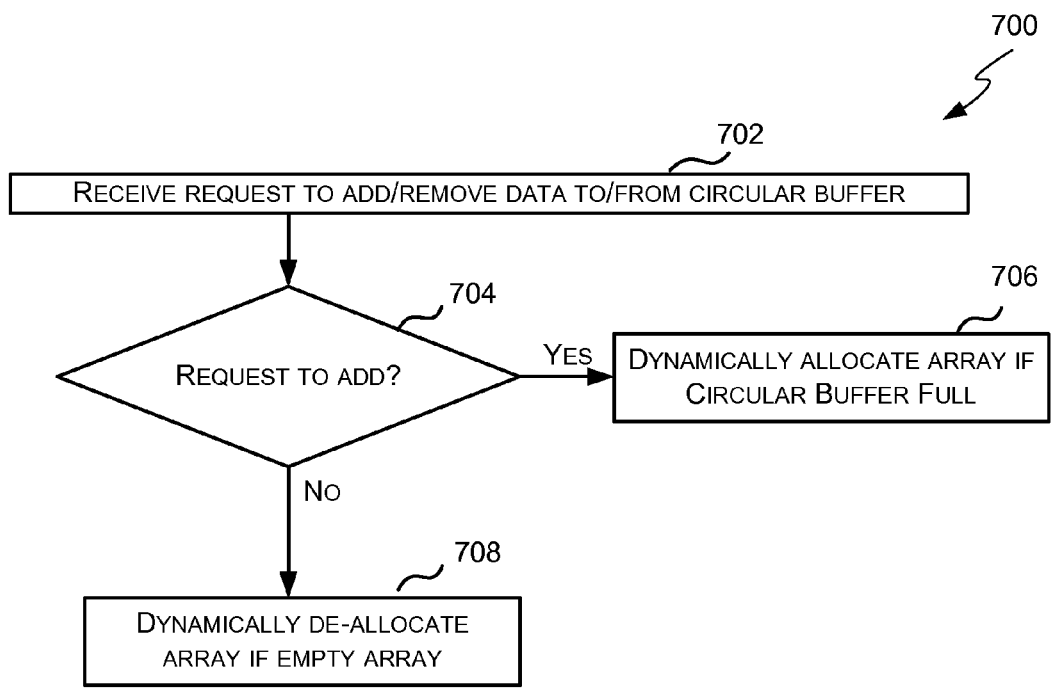
FIG. 7 is a flowchart of a method for dynamically resizing circular buffers using the circular buffer structure of FIGS. 2 to 6.

Reference is now made to FIG. 7 which shows a flow chart of an exemplary method 700 for dynamically resizing circular buffers using the circular buffer structure 200 of FIGS. 2 to 6. At step 702 the buffer control logic 108 receives a request to add or remove data to/from a particular circular buffer 204 or 206. At step 704 the buffer control logic 208 determines whether the request is an addition request or a removal request. If the buffer control logic 208 determines that the request is an addition request, then the method 700 proceeds to step 706. Otherwise, the request is a removal request and the method 700 proceeds to step 708.

At step 706, the buffer control logic 208 dynamically allocates an array to the particular circular buffer 204 or 206 if it is required to be able to add data to the circular buffer. For example, the buffer control logic may allocate a free array to the particular circular buffer 204 or 206 if the arrays currently allocated to the particular circular buffer 204 or 206 do not have any free elements. An exemplary method for implementing step 706 of the method 700 will be described in reference to FIG. 8. At step 708, the buffer control logic 208 dynamically de-allocates an array from the particular circular buffer 204 or 206 if removal of data from the particular circular buffer 204 or 206 will create an empty array. For example, the buffer control logic 208 may de-allocate an array from the particular circular buffer 204 or 206 if removal of the data will leave one of the arrays allocated to the particular circular buffer 204 or 206 empty. An array will be considered empty if it does not contain valid data for the circular buffer. An exemplary method for implementing step 708 of the method 700 will be described in reference to FIG. 9.

Figure 8:
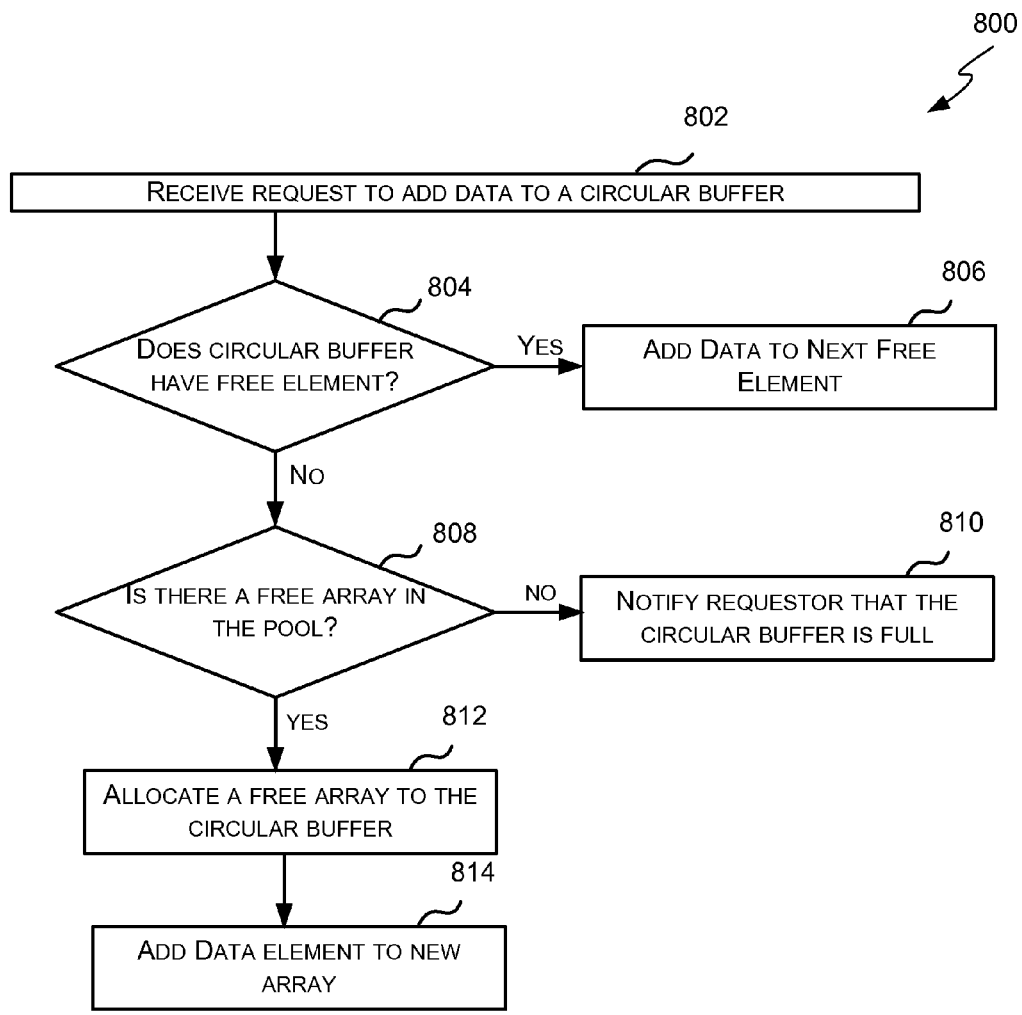
FIG. 8 is a flowchart of a method for dynamically allocating an array to a circular buffer.

Reference is now made to FIG. 8 which shows a flow chart of an exemplary method 800 for dynamically allocating an array to a circular buffer. At step 802 the buffer control logic 208 receives a request from a process to add data to a particular circular buffer 204 or 206. At step 804, the buffer control logic 208 determines whether the identified circular buffer 204 or 206 is full (e.g. whether it has a free element at the end of the circular buffer 204 or 206). Determining whether the identified circular buffer is full may, for example, comprise first assessing whether the tail element (the element identified by the second part of the tail pointer 264b or 266b) is the last element in the array (the array identified by the first part of the tail pointer 264a or 266a). If the tail element is not the last element in the array then it may be determined that the identified circular buffer 204 or 206 is not full (e.g. it does have a free element).

If the tail element is the last element in the array then the buffer control logic 208 may assess whether or not the first part of the tail pointer 264a or 266b and the allocation pointer 268 or 270 point to the same array. If the first part of the tail pointer 264a or 266a and the allocation pointer 268 or 270 point to the same array then it may be determined that the identified circular buffer 204 or 206 is full (e.g. it does not have a free element). If, however, the first part of the tail pointer 264a or 266a and the allocation pointer 268 or 270 do not point to the same array then it may be determined that the identified circular buffer 204 or 206 is not full (e.g. it does have a free element). Specifically, if the first part of the tail pointer 264a or 266a and the allocation pointer 268 or 270 do not point to the same array then a free array has already been added to the end of the circular buffer 204 or 206 and data can be added to the circular buffer 204 or 206 without adding a new array.

If the buffer control logic 208 determines that the identified circular buffer 204 or 206 is not full (e.g. there is a free element in the circular buffer 204 or 206) the method 800 proceeds to step 806. If, however, the buffer control logic 208 determines that the buffer is full (e.g. there is not a free element at the end of the circular buffer 204 or 206) the method 800 proceeds to step 808.

At step 806, the buffer control logic 208 adds the new data to the next free element in the circular buffer 204 or 206. Adding the new data to the next free element in the circular buffer 204 or 206 may comprise incrementing the tail pointer (e.g. tail pointer 264 or 266) to point to the next free element in the circular buffer and then adding the new data to the new tail element. For example, if the tail pointer 264 or 266 initially points to the first element in an array, incrementing the tail pointer 264 or 266 comprises adjusting the second part of the tail pointer 264b or 266b to point to the second element in the array. In another example, if the tail pointer 264 or 266 initially points to the last element in an array, incrementing the tail pointer 264 comprises adjusting the first part of the tail pointer 264a or 266a to point to the next allocated array and adjusting the second part of the tail pointer 264b or 266b to point to the first element in the array. Once the tail pointer 264 or 266 has been incremented the new data is added to the new tail element. Once the new data has been added to the circular buffer 204 or 206 the method 800 ends.

At step 808, the buffer control logic 208 determines whether there are any free or unused arrays in the pool of arrays 202 that may be assigned or allocated to the identified circular buffer 204 or 206. If there are no free or unused arrays then the method 800 proceeds to step 810. If, however, there is at least one free or unused array then the method 800 proceeds to step 812.

At step 810, the buffer control logic 208 notifies the process attempting to add data to the circular buffer that the circular buffer 204 or 206 is full. This may cause the process to stall until an array becomes free.

In some cases, instead of notifying the process attempting to add data to the circular buffer 204 or 206 that the circular buffer 204 or 206 is full, the buffer control logic 208 checks to see if there are any other free elements in the arrays allocated to the circular buffer. For example, a circular buffer may be assigned two arrays. The head pointer 260 or 262 points to the last element in one array and the tail pointer 264 or 266 points to the last element in the other array. In this example, if a request to add data to the circular buffer 204 or 206 is received then according to step 804 it will be determined that there are no free elements in the array since there are no free elements at the end of the array (e.g. in the second/end array). In this case, the process may stall until an array becomes available despite the fact that there are free elements in the first array. To address this problem, in some cases, before proceeding to step 810 the buffer control logic 208 may check to see if there are any free elements at the beginning of the circular buffer 204 or 206. If there are free elements at the beginning of the circular buffer 204 or 206 then the buffer control logic 208 adds the new data to the next free element and updates the tail pointer 264 or 266 to reflect the new data. This effectively allows the circular buffers 204 or 206 to wrap around in a manner similar to the traditional circular buffers described in relation to FIG. 1. If there are no free elements at the beginning of the circular buffer then the method proceeds to step 810.

It should be noted that when new data is added to the circular buffer 204 or 206 in this manner there is a chance (which increases with a fast addition rate, or a slow removal rate) that the tail pointer 264 or 266 will catch up with the head pointer 260 or 262 causing the process to stall. If this occurs, then it doesn't matter how many arrays become available in the meantime, the process continues to stall until the head pointer 260 or 262 advances. Furthermore, even if the head pointer 260 or 262 does advance there is a high risk of the stall occurring again (because the head and tail pointers are closer together) until the head pointer advances into the next array. Accordingly, allowing the circular buffers 204 or 206 to wrap around when there are no arrays available in the pool 202 allows a process to continue in the short term, but may cause greater problems in the long run.

At step 812 the buffer control logic 208 assigns or allocates one of the free or unused arrays to the identified circular buffer 204 or 206. Where all the arrays are of the same size the buffer control logic 208 simply selects one of the free or unused arrays and assigns it to the identified circular buffer 204 or 206. Where, however, the arrays are of different sizes the buffer control logic 208 may first determine which of the arrays is most suitable for the identified circular buffer 204 or 206 and then assign or allocate the most suitable array to the identified circular buffer. As described above, in some cases the buffer control logic 208 may monitor how quickly the tail element is catching up with the end of an array and use this information to determine whether to allocate a small or large array to the identified circular buffer.

Once the buffer control logic 208 has selected a free or unused array, the array is assigned or added to the identified circular buffer 204 or 206 by updating the tail pointer 264 or 266 to point to the first element in the new array. For example, the first part of the tail pointer 264a or 266a may be updated to point to the new array assigned to the circular buffer 204 or 206 and the second part of the tail pointer 264b or 266b may be updated to point to the first element in the array. Once a free or unused array is assigned to the identified circular buffer the method 800 proceeds to step 814.

At step 814, the new data is added to the new tail element (the first element in the new array). Once the new data has been added to the identified circular buffer 204 or 206 the method 800 ends.

Where the buffer control logic 208 is configured to impose maximum and/or minimum thresholds on the number of arrays that can be assigned to a circular buffer 204 or 206, the buffer control logic 208 may assess whether the identified circular buffer 204 or 206 has reached its limit prior to assigning or adding the array to the circular buffer 204 or 206. If the identified circular buffer 204 or 206 has not reached its maximum threshold then the method proceeds to step 812. If however, the identified circular buffer 204 or 206 has reached or exceeded its maximum threshold then the method proceeds to step 810.

Figure 9:
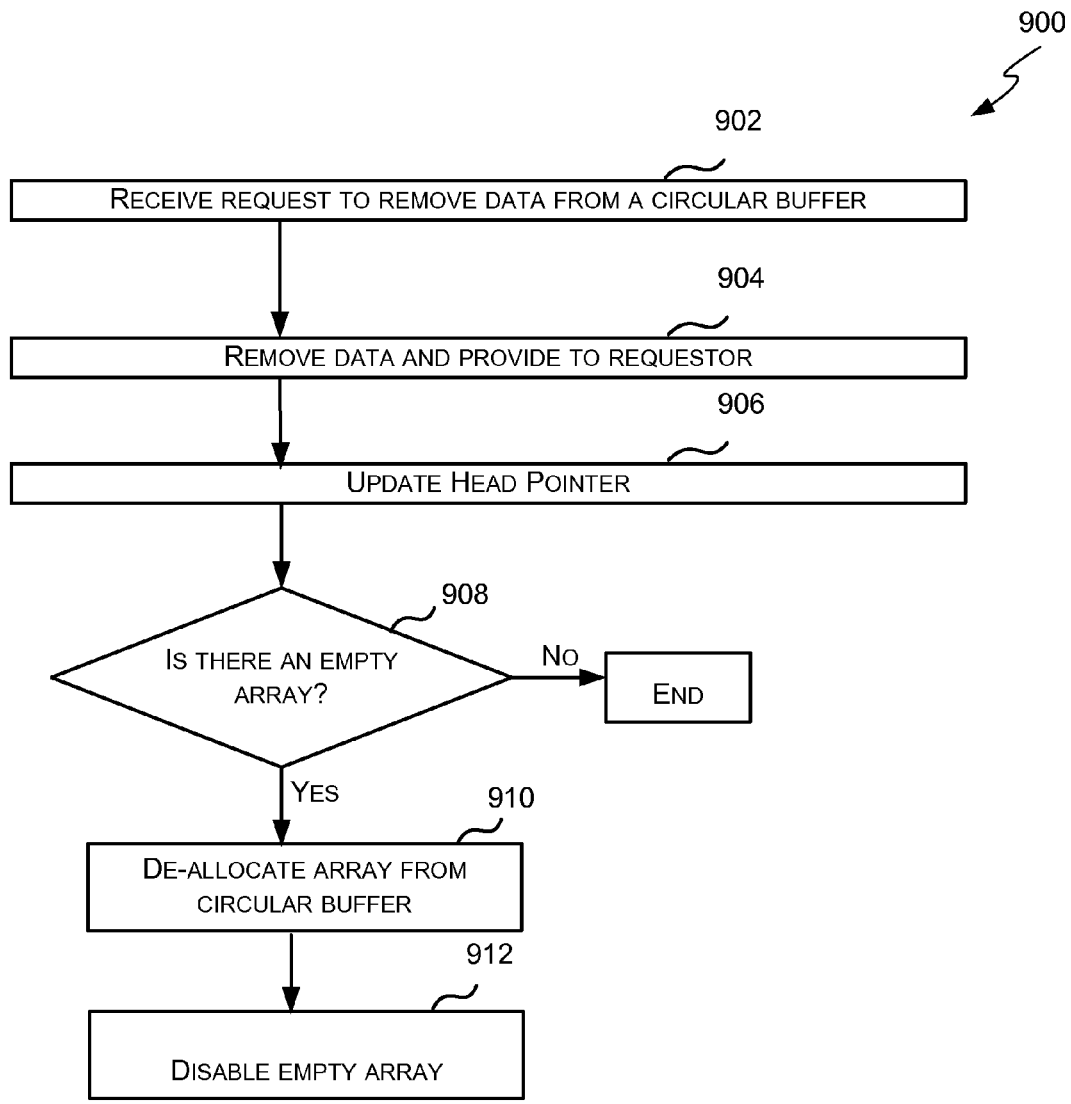
FIG. 9 is a flowchart of a method for dynamically de-allocating an array from a circular buffer.

Reference is now made to FIG. 9 which shows a flow chart of an exemplary method 900 for dynamically de-allocating an array from a circular buffer 204 or 206. At step 902 the buffer control logic 208 receives a request from a process to remove data from a particular circular buffer 204 or 206. At step 904 the buffer control logic 208 retrieves the data from the head element (the element identified by the head pointer 260 or 262) and provides it to the process requesting the data. Once the data has been provided to the requesting process, the method 900 proceeds to step 906.

At step 906, the buffer control logic 208 increments the head pointer 260 or 262 to point to the next element in the circular buffer to reflect the fact that data has been removed from the circular buffer. For example if the head pointer 260 or 262 was initially pointing to the first element of an array, incrementing the head pointer 260 or 262 comprises adjusting the second part of the head pointer 260b or 262b to point to the second element in the array. In another example, if the head pointer 260 or 262 was initially pointing to the last element in an array, incrementing the head pointer 260 or 262 comprises adjusting the first part of the head pointer 260a or 262a to point to the next array allocated to the circular buffer 204 or 206 and adjusting the second part of the head pointer 260b or 262b to point to the first element in the array. Once the head pointer has been incremented the method 900 proceeds to step 908.

At step 908, the buffer control logic 208 determines whether removal of the data in the head element has created an empty array. Determining whether the removal has created an empty array may comprise assessing whether the head element is the first element in an array (e.g. before the data was removed it was the last element in an array). If the head element is the first element in an array then it may be determined that the removal of data has created an empty array. In some cases, if the head element is not the first element in an array then it may be determined that the removal of data has not created an empty array.

In other cases, if, the head element is not the first element in the array then the buffer control logic 208 may also assess whether the head pointer is equal to the tail pointer. In these cases, if the head pointer is equal to the tail pointer, then it may be determined that there is now an empty array. If, however, the head pointer is not equal to the tail pointer, then it may be determined that there is not an empty array.

If the buffer control logic 208 determines that removal of the data has not created an empty array then the method 900 ends. If, however, the buffer control logic 208 determines that removal of data has created an empty array then the method 900 proceeds to step 910.

At step 910, the buffer control logic 208 de-allocates or de-assigns the empty array from the identified circular buffer 204 or 206. Once the array has been de-assigned it becomes a free or unused array that can be assigned to any circular buffer 204 or 206. The method 900 then proceeds to step 912.

At step 912, the buffer control logic 208 disables the empty array to save power. Once the array has been disabled the method 900 ends.

Where the buffer control logic 208 is configured to impose a minimum threshold on the number of arrays that are assigned to a circular buffer 204 or 206, the buffer control logic 208 may assess whether the identified circular buffer 204 or 206 has reached its minimum threshold prior to de-assigning the array from the circular buffer 204 or 206 in step 910. If the identified circular buffer 204 or 206 has not reached its minimum threshold then the method proceeds to step 910. If, however, the identified circular buffer 204 or 206 has reached its minimum threshold then the buffer control logic 208 may determine whether the minimum threshold is one or greater than one. If the minimum threshold is one the method 900 may end after step 908. Specifically, the remaining array assigned to the circular buffer 204 or 206 is neither de-assigned from the circular buffer nor is it disabled. In some cases, before the method ends the buffer control logic 208 may adjust the head and tail pointers 260 or 262 and 264 or 266 to point the start of the array to optimize use of the array in the future. For example, both the head and tail pointers 260 or 262 and 264 or 266 may be set to the first element in the array allocated to the circular buffer 204 or 206.

If, however, the minimum threshold is greater than one, the buffer control logic 208 may be configured to de-assign the empty array from the identified circular buffer as described in step 910 and then re-assign it to end of the identified circular buffer 204 or 206.

FIGS. 5, 6 and 10 will be used to demonstrate de-assignment and re-assignment of an array to a circular buffer. In FIG. 5 the second circular buffer 206 is assigned two arrays 216 and 218. The head pointer 262 points to the last element 250 of the fourth array 216 and the tail pointer 266 points to the second element 254 of the fifth array 218. When an element is removed from the circular buffer 206, the head pointer 262 is incremented to point to the first element 252 of the fifth array 218 (this is shown in FIG. 6). Array 216 is now an empty array. Where the minimum number of arrays assigned to a circular buffer 204 or 206 is two, instead of disabling the empty array 216 as described in step 912, the empty array 216 is re-assigned to the end of the circular buffer 206. Specifically, the allocation pointer 270 is updated so that it points to the empty array 216 and a logical link is created between the last element 258 of the fifth array 218 and the first element 244 of the fourth array 216 (this is shown in FIG. 10).

Figure 11:
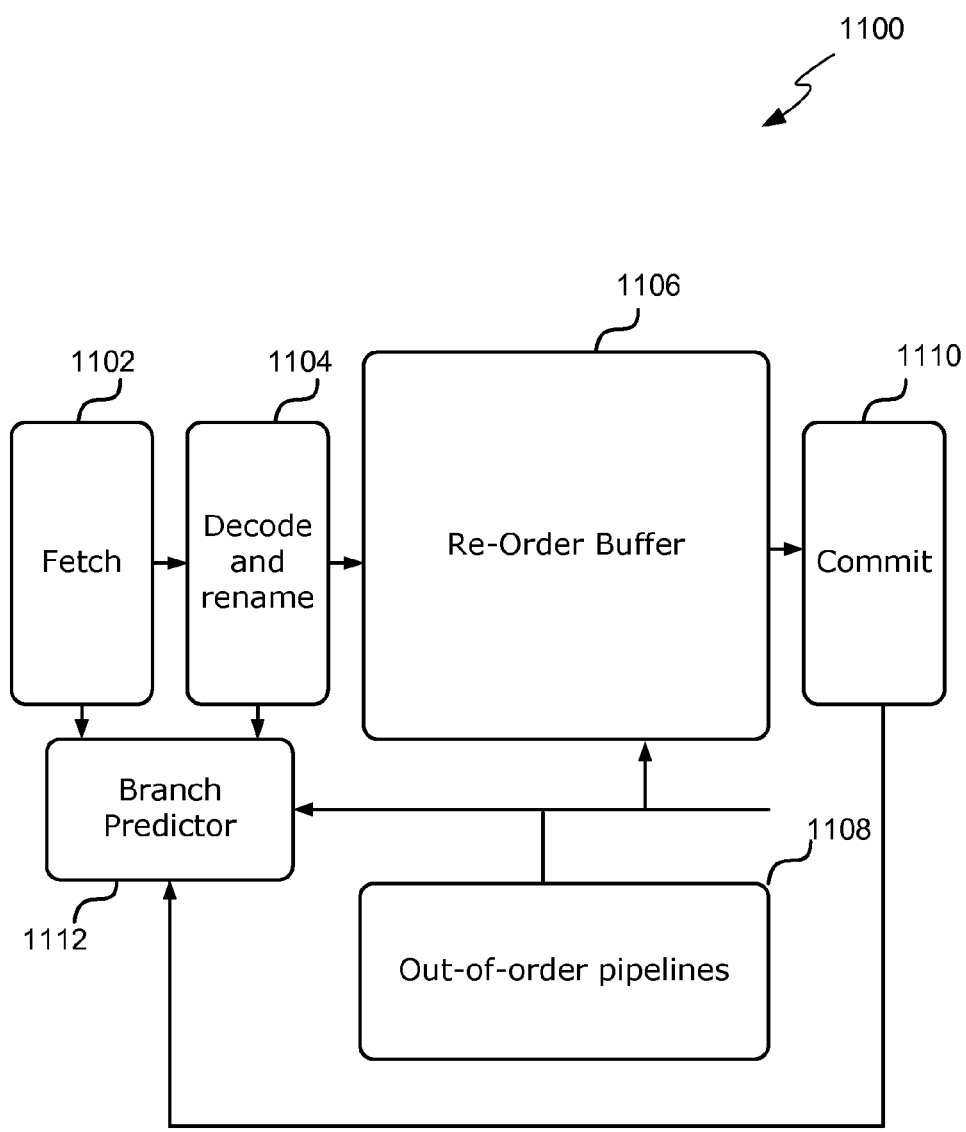
FIG. 11 is a schematic of an out of order processor having a re-order buffer with the circular buffer structure of FIGS. 2 to 6.

Reference is now made to FIG. 11 which shows a schematic of an out-of order processor 1100 having a re-order buffer with the circular buffer structure of FIGS. 2 to 6. The out-of-order processor 1100 comprises a fetch stage 1102 arranged to fetch instructions from a program (in program order) as indicated by a program counter (PC), and a decode and renaming stage 1104 arranged to interpret the instructions and perform register renaming. Register renaming enables more instructions to be executed out-of-order, by removing write-after-read (WAR) dependencies.

When an instruction passes through the renaming stage 1104, it is inserted into a re-order buffer 1106 (ROB). The re-order buffer 1106 is a buffer that enables the instructions to be executed out-of-order, but committed in-order. The re-order buffer 1106 holds the instructions that are inserted into it in program order, but the instructions within the ROB can be executed out of sequence by out-of-order pipelines 1108. In this case the re-order buffer 1106 is formed as a circular buffer having the circular buffer structure 200 of FIGS. 2 to 6.

The processor 1100 also comprises a branch predictor 1112, which is arranged to predict which direction the program flow will take in the case of instructions known to cause possible flow changes, such as a branch instruction. Branch prediction is useful as it enables instructions to be speculatively executed by the out-of-order processor before the outcome of the branch instruction is known. The branch predictor 1112 can receive inputs from the fetch stage 1102 and decode and renaming stage 1104 relating to new instructions, and input from the pipelines 1108 and commit stage 1104 relating to how issued instructions have executed.

Reference is now made to FIG. 12 which shows a schematic of a multi-threaded out-of order processor 1200. The processor 1200 comprises two threads 1202 and 1204. Each thread 1202 and 1204 comprises a fetch stage 1206 or 1208, a decode and renaming stage 1210 or 1212, a re-order buffer 1214 or 1216 and a commit stage 1218 or 1220 as described above in reference to FIG. 11. The threads 1202 and 1204 share a branch predictor 1222 and the out-of-order pipelines 1224. The re-order buffers 1214 and 1216 also share a pool of arrays 1226 and buffer control logic 1228 as described above in references to FIGS. 2 to 6.

In the description above, methods and apparatus for dynamically allocating resources to circular buffers are described. These methods may be applied to any circular buffer (e.g. re-order buffer or reservation station) in a processor. The methods described above may be applied to all the circular buffers within a processor or to a subset of the circular buffers. Where the methods are only applied to a subset of the circular buffers, the methods may, for example, be applied to a specific type of circular buffers (e.g. re-order buffers).

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A circular buffer structure comprising:
a plurality of arrays, wherein each array comprises at least two storage elements configured to store data;
one or more circular buffers; and
buffer control logic configured to:
receive at least one of (a) a request to add data to a particular circular buffer and (b) a request to remove data from a specific circular buffer;
if a request to add data to a particular circular buffer is received when the particular circular buffer is full, dynamically allocate an array to the particular circular buffer and add the new data to the dynamically allocated array; and
if a request to remove data from a specific circular buffer is received and removal of the data from the specific circular buffer creates an empty array, dynamically de-allocate the empty array from the specific circular buffer and disable the de-allocated array;
wherein the buffer control logic is configured to:
only dynamically allocate an array to the particular circular buffer if a number of arrays already allocated to the particular circular buffer is not equal to or greater than a maximum threshold,
increase the maximum threshold when the buffer control logic detects a situation in which speed is more important than power conservation, and
decrease the maximum threshold when the buffer control logic detects a situation in which power conservation is more important than speed.

2. The circular buffer structure according to claim 1, wherein the circular buffer structure comprises a plurality of circular buffers and the plurality of arrays are shared between the plurality of circular buffers.

3. The circular buffer structure according to claim 1, wherein each of the arrays comprise the same number of storage elements.

4. The circular buffer structure according to claim 1, wherein at least two of the arrays comprise a different number of storage elements.

5. The circular buffer structure according to claim 4, wherein:
each circular buffer comprises a tail element and a head element; and
the buffer control logic is further configured to select the array to be allocated to the particular circular buffer based on how quickly the tail element is catching up with the end of the array in which it is situated.

6. The circular buffer structure according to claim 5, wherein the buffer control logic is configured to select an array with a larger number of storage elements when the tail element is catching up quickly with the end of the array and to select an array with a smaller number of storage elements when the tail element is catching up slowly with the end of the array.

7. The circular buffer structure according to claim 1, wherein the maximum threshold is expressed as a percentage of the plurality of arrays.

8. The circular buffer structure according to claim 1, wherein at least two of the circular buffers have different maximum thresholds.

9. The circular buffer structure according to claim 1, wherein the buffer control logic is configured to only de-allocate an array from the specific circular buffer if the number of arrays allocated to the specific circular buffer is greater than a minimum threshold.

10. The circular buffer structure according to claim 9, wherein at least two of the circular buffers have different minimum thresholds.

11. The circular buffer structure according to claim 1, wherein disabling the de-allocated array comprises turning off the power to each storage element of the array.

12. The circular buffer structure according to claim 1, wherein each storage element can be read from.

13. A processor comprising the circular buffer structure according to claim 1.

14. The processor according to claim 13, wherein the processor is an out-of-order processor and the one or more circular buffers comprise at least one of a re-order buffer and a reservation station.

15. A method of dynamically resizing one or more circular buffers in a processor, the method comprising:
providing a plurality of arrays, each array comprising at least two storage elements configured to store data;
receiving at buffer control logic at least one of (a) a request to add new data to a particular circular buffer and (b) a request to remove data from a specific circular buffer;
if a request to add new data to a particular circular buffer is received when the particular circular buffer is full, dynamically allocating using the buffer control logic an array to the particular circular buffer and adding the new data to the dynamically allocated array; and
if a request to remove data from a specific circular buffer is received and removal of the data from the specific circular buffer creates an empty array, dynamically de-allocating using the buffer control logic the empty array from the specific circular buffer and disabling the de-allocated array;

wherein an array is only dynamically allocated to the particular circular buffer if a number of arrays already allocated to the particular circular buffer is not equal to or greater than a dynamically determined maximum threshold;
the method further comprising using the buffer control logic to:
increase the maximum threshold when the buffer control logic detects a situation in which speed is more important than power conservation, and
decrease the maximum threshold when the buffer control logic detects a situation in which power conservation is more important than speed.

16. A non-transitory computer readable storage medium having encoded thereon computer readable program code for generating a processor configured to:
provide a plurality of arrays, each array comprising at least two storage elements configured to store data;
receive at buffer control logic at least one of (a) a request to add new data to a particular circular buffer and (b) a request to remove data from a specific circular buffer;
if a request to add new data is received at the buffer control logic when the particular circular buffer is full, dynamically allocate using the buffer control logic an array to the particular circular buffer and add the new data to the dynamically allocated array; and
if a request to remove data for a specific circular buffer is received at the buffer control logic and removal of the data from the specific circular buffer creates an empty array, dynamically de-allocate using the buffer control logic an array from the specific circular buffer and disable the de-allocated array;
wherein an array is only dynamically allocated to the particular circular buffer if a number of arrays already allocated to the particular circular buffer is not equal to or greater than a dynamically determined maximum threshold; and
the processor is further configured to use the buffer control logic to:
increase the maximum threshold when the buffer control logic detects a situation in which speed is more important than power conservation, and
decrease the maximum threshold when the buffer control logic detects a situation in which power conservation is more important than speed.

* * * * *